United States Patent [19]

Asano et al.

[11] Patent Number: 5,093,882
[45] Date of Patent: Mar. 3, 1992

[54] WAVELENGTH CONVERSION DEVICE

[75] Inventors: Kazuo Asano, Hachioji; Miki Horii, Sagamihara; Yuko Nagasawa, Tokorozawa; Hidetaka Ninomiya, Mitaka, all of Japan

[73] Assignee: Konica Corporation, Tokyo, Japan

[21] Appl. No.: 672,079

[22] Filed: Mar. 19, 1991

[30] Foreign Application Priority Data

Mar. 29, 1990 [JP] Japan .................................. 1-78644

[51] Int. Cl.⁵ .............................................. G02F 1/37
[52] U.S. Cl. .................................. 385/122; 359/328; 359/332; 385/125; 385/143
[58] Field of Search ............... 350/96.12, 96.15, 96.29, 350/96.30, 96.32, 96.33, 96.34; 307/425-430

[56] References Cited

U.S. PATENT DOCUMENTS

| | | | |
|---|---|---|---|
| 4,839,536 | 6/1989 | Etter et al. | 307/425 |
| 4,959,477 | 9/1990 | Etter et al. | 546/307 |
| 4,992,214 | 2/1991 | Etter et al. | 252/587 |

Primary Examiner—John D. Lee
Attorney, Agent, or Firm—Finnegan, Henderson, Farabow, Garrett, and Dunner

[57] ABSTRACT

A wave length conversion device of fibre type having a nonlinear optical material as a core which is consist of a single crystal of 2-methoxy-5-nitrophenol is disclosed. When the principal absorption axis of the single crystal is perpendicular to a center axis of the fibre (the material for cladding the core), the efficiency of the conversion the wave length is the highest.

10 Claims, 2 Drawing Sheets

FIG. I

WAVELENGTH CONVERSION DEVICE

FIELD OF THE INVENTION

The present invention relates to a wavelength conversion device for use in an optical harmonics generating apparatus and similar apparatuses, and more particularly concerns an optical fiber wavelength conversion device for use in an optical harmonics generating apparatus and similar apparatuses used to convert a wavelength of laser light.

BACKGROUND OF THE INVENTION

A nonlinear optical effect appearing remarkably with a strong light such as laser light irradiated to a material can be applied for wavelength conversion, strength modulation, switching, etc. There have been many prior disclosures about materials having the nonlinear optical effect in recent years.

Also, there have been many prior disclosures about optical recording media in response to demands for large capacity and high density of information recording media.

The recording density of the optical recording media heretofore used depends on the wavelength of light source, that is, a recording density increases in inverse proportion to square of the light source wavelength. therefore, there is a great demand for wavelength conversion device to obtain light sources of shorter wavelength.

It was pointed out that organic compounds would have extraordinary high performance in the wavelength conversion, particularly in second harmonic generation (hereinafter referred to as the SHG) on the basis of a second nonlinear optical effect, as compared with conventionally known inorganic materials such as lithium niobate ($LiNbO_3$) and potassium dihydrogen phosphate (KDP). They are described, for example, in "Organic Nonlinear Optical Materials", edited by Masao Kato and Hachiro Nakanishi, C.M.C. Co., 1985.

Optical Nonlinearity of the organic compounds is originated in x electrons in molecules thereof. Second-order nonlinear molecular polarizability B can be made particularly great when the compounds have both electron donor substituent group and electron acceptor substituent group.

However, even if the nonlinear polarization is high at a molecular level, as typically shown by p-nitroaniline, it is often seen that no SHG is caused in state of crystal at all, or it is too little even if made. These are due to the fact that the molecular alignment of highly polarized molecules in crystal tends to be inverse symmetrical.

Known compounds having the SHG effect include, for example, 2-methyl-4-nitroaniline (MNA), 2-acetamide-4-nitro-N, N-dimethylaniline (DAN), 2-acetamide-4-nitro-1-pyrrolidinobenzene (PAN), 2-($\alpha$-methylbenzil)amino-5-nitropyridine (MBA-NP).

In order to make up the wavelength conversion device having high conversion efficiency with use of the materials mentioned above, a nonlinear polarization wave induced by a fundamental wave has to be phase-matched with a second harmonic wave caused by it. There have been proposed the wavelength conversion devices of optical waveguide type, such as a plane plate optical waveguide, a channel waveguide, and an optical fiber. These have been attracting attention as they could have high wavelength conversion efficiency. The reasons are that they can make the phase-matching in a relatively easy way with use of mode dispersion or Cerenkov radiation process, and as they also can have a high optical power density in the way that the optical wave is enclosed in a waveguide.

For example, a conventional optical fiber waveguide device has been made up in the way that a nonlinear optical material having high refractive index is melted and injected in hollow fiber formed of a material having lower refractive index. It then is crystallized to core hof single crystal in the Bridgman-Stockberger's method or similar way. For detail, as an example, see "Nonlinear Optical Properties of Organic Molecules and Crystals, Vol. 1, edited by D. S. Chemla and J. Zyss, Academic Press Inc., 1987.

There have been proposed fiber nonlinear optical devices having MNA, DAN, or m-DNB used for the core, these have the disadvantage that these organic nonlinear optical materials are not only hard to grow to single crystal, but also they tend to have defects, such as voids, cracks, and rotation of crystal axes, caused in the single crystal formed.

In the way that single crystal of nonlinear optical material grow in the hollow fiber, the above nonlinear optical materials have the molecular polarization axis made to become in parallel with the fiber axis. This is hard to form the wavelength conversion device having the high conversion efficiency obtained with full use of the nonlinear optical effect inherent to the materials.

SUMMARY OF THE INVENTION

In view of the foregoing, it is a general object of this invention to provide a fiber wavelength conversion device having high conversion efficiency in the way that organic nonlinear optical materials having high nonlinear optical effect are used and formed in core of hollow fiber so that their single crystals can be made to be optimally oriented in molecular polarization axis, with the crystal structure not being centrosymmetrical in the single crystal.

Other object of the present invention will be obvious from the contents of the specification herein after disclosed.

Briefly, the foregoing object is accomplished in accordance with aspects of the present invention by a wavelength conversion device of organic crystal cored fiber, characterized in that the nonlinear optical material used is 2-methoxy-5-nitrophenol, a material for the core formed in a capillary-shaped clad material is single crystal of the nonlinear optical material, and a principal absorption axis of the single crystal is perpendicular to a center axis of the fiber.

BRIEF DESCRIPTION OF THE DRAWINGS

In the accompanying drawings.

DETAILED DESCRIPTION OF THE INVENTION

The following describes the present invention in detail.

Figure 1:
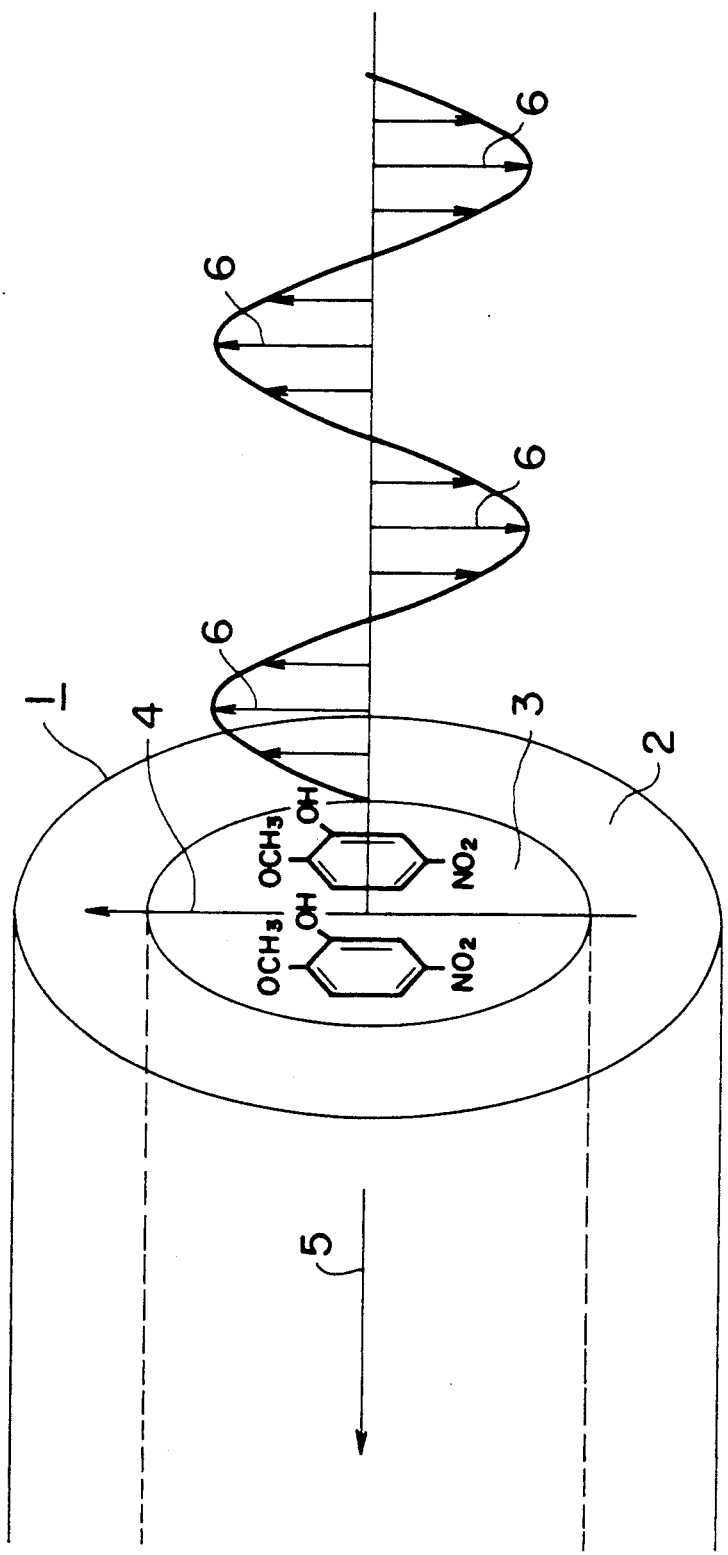
FIG. 1 is a conceptual illustration of a wavelength conversion device according to the present invention.

FIG. 1 is a conceptual illustration of the present invention. In the figure is shown a fiber wavelength conversion device (SHG device), a clad 2, and a core 3, a principal absorption axis 4 (indicated by arrow) of a single crystal of a nonlinear optical material, a fiber axis 5 indicated by arrow, and fundamental wave electric field directions 6 indicated by arrows.

Figure 2:
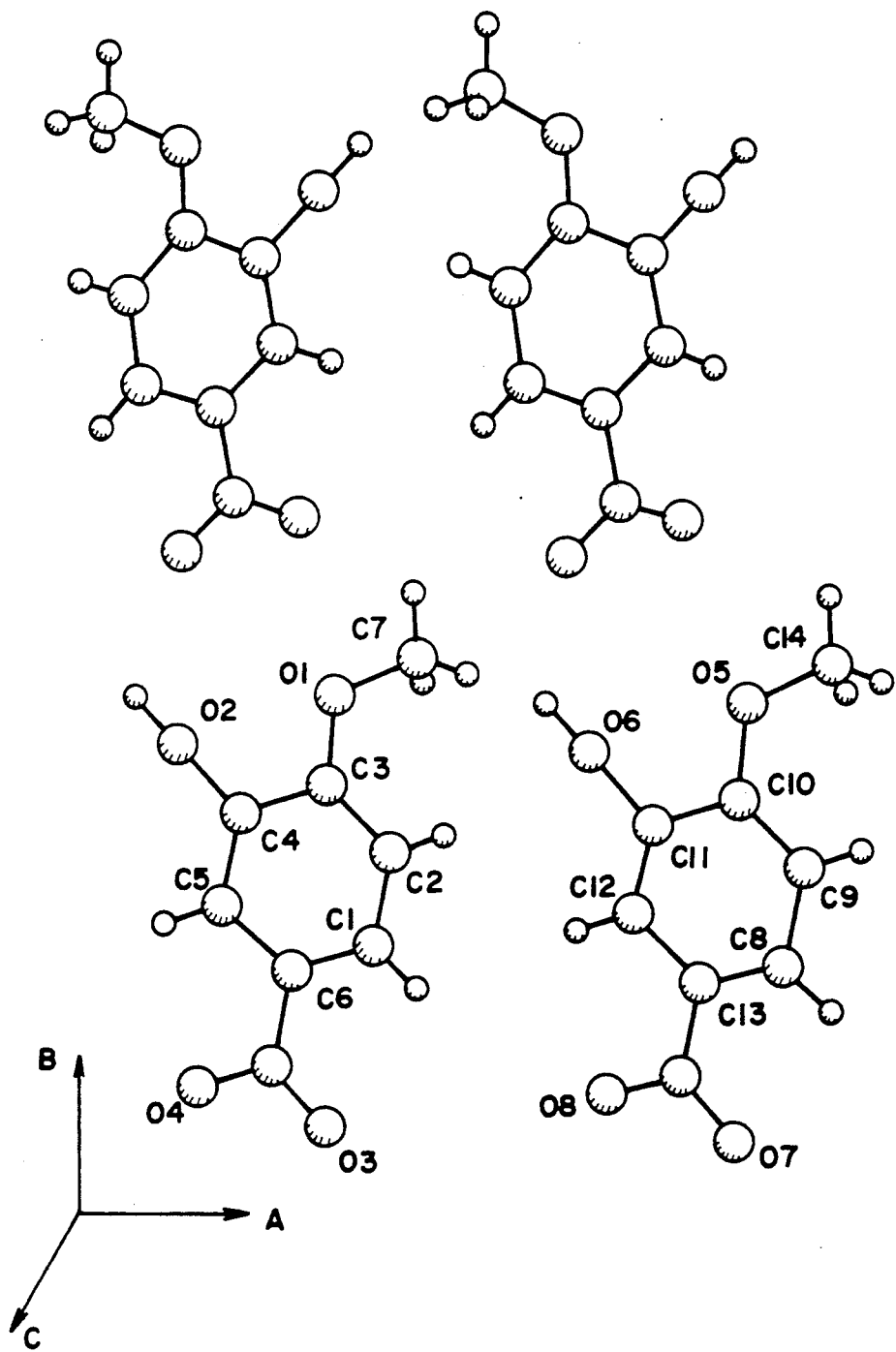
FIG. 2 shows molecule configurations of the MNP single crystals.

The nonlinear optical material used for the wavelength conversion device in the present invention is 2-methoxy-5-nitrophenol (hereinafter referred to as the MNP). The crystal structure of MNP is not centrosymmetrical, and in which molecular polarization axes of MNP molecules are aligned in mostly one direction as shown in FIG. 2. It was found that it has a great nonlinear optical effect. In the figure, A indicates an axis a of the crystal axes, B is an axis b of the crystal axes, and C is an axis c of the crystal axes.

In accordance with the present invention, the core comprising the single crystal of the MNP is formed in the capillary-shaped clad material. The single crystal of the MNP has an advantage in small light propagation loss due to little defects, such as voids, cracks, and rotations of the crystal axes. The single crystal also has a relatively short transmittance cut-off wavelength so that it can be used for conversion to light as short as around 430 nm.

It can be confirmed that the crystal core formed in the capillary-shaped clad material is made to be single crystal as uniform extinction direction can be observed for the core between crossed polarizers with use of a polarizing microscope.

In accordance with the present invention, the principal absorption axis of the single crystal of he MNP forming the core is virtually perpendicular to the fiber axis. The term "principal absorption axis" as used herein is construed an axial direction in which the electric field of the light coming into the single crystal is linearly polarized and is most strongly absorbed at a wavelength near the transmittance cutoff wavelength (which is a wavelength at which the transmittance is 95% of the maximum transmittance). For the MNP single crystal, in actual, the principal absorption axis is a polarizing direction of electric field of a white linear polarized light in which yellow coloring of the core is observed the deepest. The principal absorption axis of the MNP single crystal core in the fiber wavelength conversion device can be confirmed by observing yellow coloring of the core from round sides of the fiber with use of a polarization microscope.

It is preferable for a maximum wavelength conversion efficiency to make the principal absorption axis of the MNP single crystal 90 degrees to the fiber axis plus minus 10 degrees. It can be effectively used with the conversion efficiency higher than ½ of the maximum efficiency even if the principal absorption axis is deviated, say less than 45 degrees, from 90 degrees.

In the present invention, for the clad material can be used any materials such as glass or plastics. It is however preferable to use the glass material containing lead compounds less than 10%. With use of the glass material for the clad material, the principal absorption axis of the MNP single crystal can be easily made perpendicular to the fiber axis. Method available to form the core of the MNP single crystal in the capillary-shaped clad material include the Bridgman method, the Bridgman-Stockberger method, solution evaporation method, and similar known processes. With use of the glass material containing the lead component more than 10% as the clad material, the principal absorption axis of the MNP single crystal is liable to be made in parallel with the fiber axis.

A refractive index of the clad material to the fundamental wave in the present invention should be preferably 1.70 to 1.87. The refractive index of the clad material has to be set so that the fundamental wave should be a guided mode and that a second optical harmonic should be a radiative mode into the clad by a Cerenkov phase matching. The measured refractive index for the fundamental wave (the wavelength of which should be longer than 850 nm) of the MNP single crystal core in the incoming fundamental wave polarization direction (axis b direction) in which the highest wavelength conversion efficiency can be obtained, is 1.87 at maximum. The refractive index of the clad material for the fundamental wave, therefore, has to be less than 1.87 to make the fundamental wave the guided mode of the core.

As glass materials used for a cladding material, LaSF and LaF series manufactured by Ohara Inc., NbFD, NbF, TaF and TaC series manufactured by HOYA Corporation, LaSF, LaF and Lak series manufactured by Sumita Optical Glass Co., Ltd. and LaSF and LaF Series manufactured by Schott Co., Ltd. can be used preferably.

On the other hand, if the refractive index of the clad material for the fundamental wave is too low, the guided mode for the fundamental wave of the core becomes multiple so that a higher wavelength conversion efficiency cannot be obtained. It is preferable that the refractive index of the clad material for the fundamental wave should be higher than 1.70 to make the guided mode of the fundamental wave a single mode or a multi-mode having a few lower mode for core diameter of larger than 1 $\mu$m.

In the present invention, diameter of the fiber core should be preferably 6 $\mu$m or less, or more preferably 4 $\mu$m or less to increase an effect that the fundamental wave can be enclosed in the core and to form the wavelength conversion device of single mode. If the core diameter is larger than 6 $\mu$m, power density of the fundamental wave in the core becomes too low to obtain high wavelength conversion efficiency.

The fiber wavelength conversion device according to the present invention should preferably have protection film formed on the core at both fiber ends thereof, which should be moisture proof, not oxygen transmissive, and transparent in a wavelength region used. It may further have a reflection preventive film or the like formed at the ends.

The fiber wavelength conversion device according to the present invention should be 1 to 30 mm in length and 0.1 to 3 mm in outside diameter.

It is preferable that the MNP forming the core for the fiber wavelength conversion device of the present invention should be optically pure. As the MNP tends to contain impurities which can absorb lights in the visible wavelength region, it should be preferably refined to 99.99% of purity. The MNP of less than 99.99% may be easily broken optically by a strong laser light.

While only one embodiment of the present invention has been illustrated and described in detail, it is particularly understood that invention is not limited thereto or thereby.

EXAMPLES

The compound, composition and method of the present invention may be more fully understood from the following examples which are offered by way of illustration and not by way of limitation.

Re-crystallization of the MNP was repeated three times with use of mixed solvent of ethanol and hexane.

It was further refined in a tube having nitrogen gas sealed therein in the zone melting refining process. The purity attained was 99.99% or higher. The MNP was used in the Bridgman's method to form the MNP single crystal core in a variety of capillary-shaped clad materials shown in Table 1. The fiber wavelength conversion device obtained was observed with use of the polarization microscope to investigate the principal absorption axis direction of the single crystal. The SHG light strength obtained with a Nd:YAG laser light (1064 nm) irradiated into it also was investigate. The results are shown in Table 1.

TABLE 1

|  | Clad material (Glass material) | Q'ty of lead compound contained (%) | Refractive index at 1064 nm | Core material | Core dia. (μm) | Principal absorption axis to fiber axis | SHD strength |
| --- | --- | --- | --- | --- | --- | --- | --- |
| Example 1 | LaSF-n8[1] | 1 | 1.81 | MNP | 1.2 | Perpendicular | Strong |
| Example 2 | LaSF-n7[1] | 1 | 1.75 | MNP | 1 | Perpendicular | Strong |
| Example 3 | LaSF-01[2] | 1 | 1.77 | MNP | 1.5 | Perpendicular | Strong |
| Example 4 | LaK-10[2] | 6 | 1.71 | MNP | 1.2 | Perpendicular | Strong |
| Example 5 | SK-2[2] | 0.5 | 1.60 | MNP | 1 | Perpendicular | Medium |
| Comparison 1 | BC-L[3] | 0 | 1.49 | MNA | 1.2 | Parallel | Little |
| Comparison 2 | SF-6[2] | 71 | 1.78 | MNP | 1 | Parallel | Weak |
| Comparison 3 | LaF-2[2] | 16 | 1.73 | MNP | 1.3 | Variable | — |
| Comparison 4 | BC-L[3] | 0 | 1.49 | MNP | 1 | Perpendicular | Weak |
| Comparison 5 | SK-2[2] | 0.5 | 1.60 | MNP | 7 | Perpendicular | Weak |

[1] Sumita Optical Glass Co., Ltd.
[2] Ohara Inc.
[3] Nippon Electric Glass Co., Ltd.

While the principles of the present invention have been described above in connection with a specific embodiment, and particular modifications thereof, it is to be clearly understood that this description is made only by way of example and not as a limitation on the scope of invention.

The fiber wavelength conversion device according to the present invention can accomplish the high wavelength conversion efficiency as the molecular polarization axes of the single crystals of the nonlinear optical material forming the core can be arranged in one direction, and as the principal absorption axis of the single crystal can be oriented in an ideal direction to achieve the nonlinear optical effect.

What is claimed is:

1. A wavelength conversion device of a fiber type comprising;
    a capillary-shaped cladding material having a hollow therein and
    a nonlinear optical material used as a core, being a single crystal of 2-methoxy-5-nitrophenol provided in said hollow so that
    a principal absorption axis of the single crystal being perpendicular plus or minus 45° with respect to a central axis of the fiber.

2. The device of claim 1, wherein the cladding material contains not more than 10% lead oxide as PbO.

3. The device of claim 1, wherein the refractive index of the cladding material at a fundamental wave is 1.70 to 1./87.

4. The device of claim 1, wherein the diameter of the core is not more than 6 μm.

5. The device of claim 4, wherein the diameter of the core is not more than 4 μm.

6. The device of claim 1, wherein the principal absorption axis of the single crystal is perpendicular plus or minus 10° with respect to the central axis of the core.

7. The device of claim 1, wherein the purity of the core material is not less than 99.99%.

8. A wavelength conversion device of fiber type comprising;
    a capillary-shaped cladding material having a content of lead oxide as PbO not more than 10% and a refraction index of 1.70 to 1.87 at the fundamental wave and;
    a nonlinear optical material used as a core having a diameter of not more than 6 μm, being a single crystal of 2-methoxy-5-nitrophenol having a principal absorption axis being perpendicular plus or minus 45° with respect to a central axis of the fiber.

9. The device of claim 8, wherein the principal absorption axis of the single crystal is perpendicular plus or minus 10° with respect to the central axis of the fiber.

10. The device of claim 8, wherein the diameter of the core is not more than 4 μm

* * * * *

UNITED STATES PATENT AND TRADEMARK OFFICE
CERTIFICATE OF CORRECTION

PATENT NO. : 5,093,882
DATED : March 03, 1992
INVENTOR(S) : Kazuo Asano et al.

It is certified that error appears in the above-identified patent and that said Letters Patent is hereby corrected as shown below:

Item [30]
 Title Page, Priority Data, change "1-78644" to --2-78644--.

Claim 3, column 6, line 8, change "1./87" to --1.87--.

Claim 8, column 6, line 35, before "fiber" insert --a--.

Signed and Sealed this

Twenty-eighth Day of September, 1993

Attest:

BRUCE LEHMAN

Attesting Officer    Commissioner of Patents and Trademarks